(12) United States Patent
Paulino

(10) Patent No.: US 8,844,266 B1
(45) Date of Patent: Sep. 30, 2014

(54) VARIABLE BYPASS RATIO AUGMENTED GAS TURBINE ENGINE

(75) Inventor: Jose R. Paulino, West Palm Beach, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 562 days.

(21) Appl. No.: 13/251,946

(22) Filed: Oct. 3, 2011

(51) Int. Cl.
*F02C 6/02* (2006.01)
*F02K 3/12* (2006.01)

(52) U.S. Cl.
USPC .............................. 60/226.3; 60/39.15; 60/772

(58) Field of Classification Search
CPC ................ F02C 6/02; F02C 9/18; F02K 3/12; F02K 3/04; F02K 3/06; F02K 3/062; F02K 3/075
USPC ............. 60/226.3, 226.1, 262, 263, 248, 233, 60/771, 772; 415/144, 145, 150
See application file for complete search history.

(56) References Cited

U.S. PATENT DOCUMENTS

| | | | | |
|---|---|---|---|---|
| 3,387,457 A | * | 6/1968 | Garraway | 60/224 |
| 3,585,795 A | * | 6/1971 | Grieb | 60/39.163 |
| 3,765,170 A | * | 10/1973 | Nakamura | 60/39.17 |
| 3,841,091 A | * | 10/1974 | Sargisson et al. | 60/224 |
| 3,868,818 A | * | 3/1975 | Itoh | 60/39.15 |
| 4,183,211 A | * | 1/1980 | Menioux | 60/224 |
| 4,519,208 A | * | 5/1985 | Loisy et al. | 60/262 |
| 6,865,891 B2 | * | 3/2005 | Walsh et al. | 60/792 |
| 6,968,674 B2 | * | 11/2005 | Wollenweber | 60/204 |
| 7,121,078 B2 | * | 10/2006 | Turco et al. | 60/224 |
| 7,162,859 B2 | * | 1/2007 | Franchet et al. | 60/204 |
| 7,219,499 B2 | * | 5/2007 | Turco et al. | 60/772 |
| 7,464,533 B2 | * | 12/2008 | Wollenweber | 60/39.15 |
| 8,220,245 B1 | * | 7/2012 | Papandreas | 60/39.163 |
| 2004/0144096 A1 | * | 7/2004 | Wollenweber | 60/772 |
| 2004/0168427 A1 | * | 9/2004 | Truco et al. | 60/226.1 |
| 2007/0022739 A1 | * | 2/2007 | Truco et al. | 60/226.1 |
| 2008/0245050 A1 | * | 10/2008 | Wollenweber | 60/39.15 |
| 2009/0106978 A1 | * | 4/2009 | Wollenweber | 29/889.2 |

* cited by examiner

*Primary Examiner* — J. Gregory Pickett
(74) *Attorney, Agent, or Firm* — John Ryznic

(57) ABSTRACT

A variable bypass ratio augmented gas turbine engine system for a UAV with a high pressure ratio gas turbine engine used for low power operation such as loiter speed and a low pressure ratio gas turbine engine used for high power operation. A power turbine receives hot gas flows from the two engines to drive an output shaft. At low power operation, only the high pressure ratio engine is operated. At high power operation, both engines are operated where the exhaust from the high pressure ratio engine is mixed with bleed off air form the second compressor to produce a second hot gas flow in a second combustor to drive the second turbine. The remaining compressed air from the second compressor is passed into a third combustor to produce a third hot gas flow that then flows into the power turbine.

7 Claims, 1 Drawing Sheet

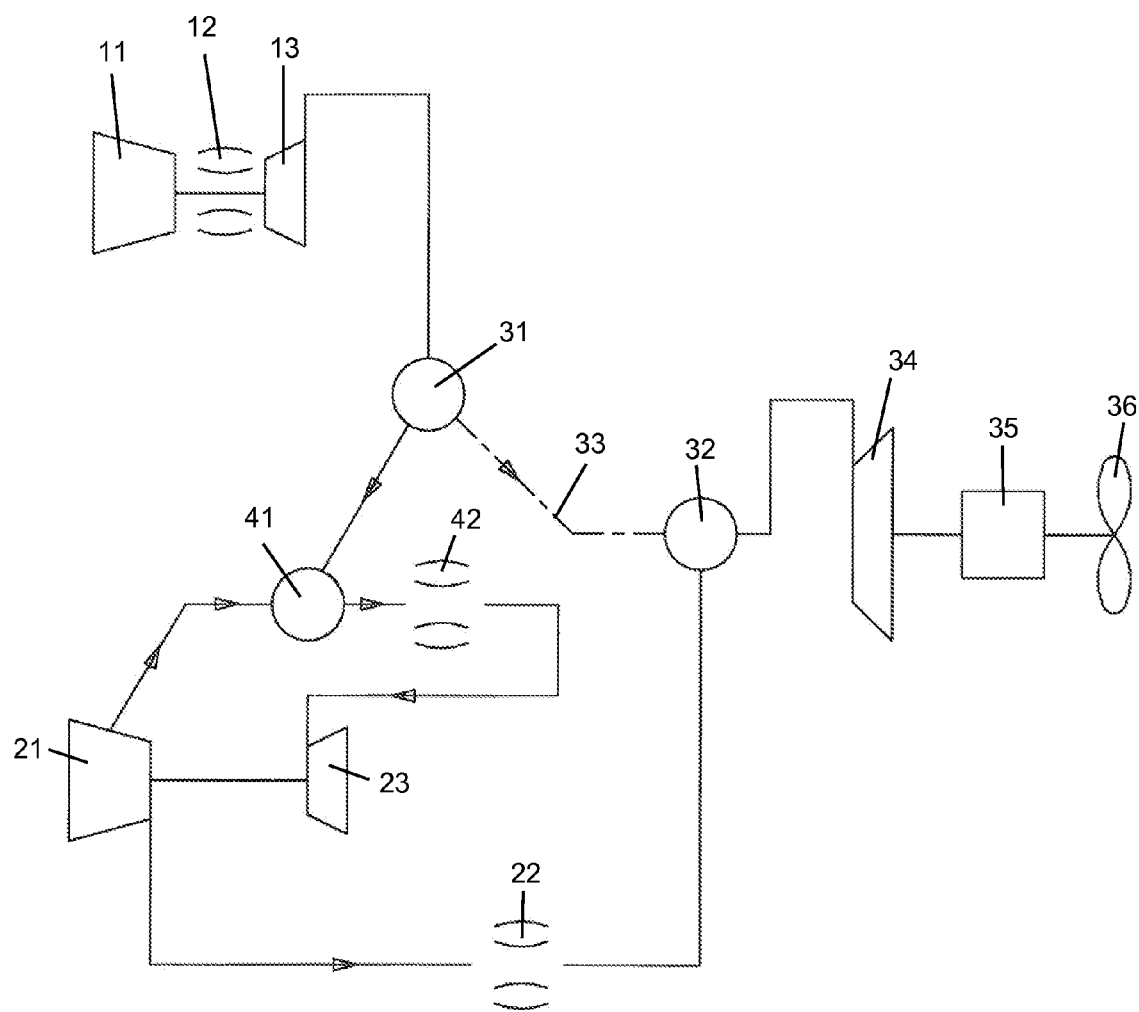

VARIABLE BYPASS RATIO AUGMENTED GAS TURBINE ENGINE

GOVERNMENT LICENSE RIGHTS

None.

CROSS-REFERENCE TO RELATED APPLICATIONS

None.

BACKGROUND OF THE INVENTION

1. Field of the Invention

The present invention relates generally to a gas turbine engine, and more specifically to a variable bypass ratio augmented gas turbine engine used to power an unmanned aero vehicle or UAV.

2. Description of the Related Art including information disclosed under 37 CFR 1.97 and 1.98

An unmanned aero vehicle (UAV) is currently being used for reconnaissance such as for military use. The US Army is a large user of these UAVs because they are small, do not use a lot of fuel, and do not require a pilot on board the aircraft. The main objective of an engine for a UAV is high fuel efficiency at low speeds, or while loitering, to allow the UAV to spend more time patrolling its target.

One prior art engine for a UAV is a diesel engine that drives a propeller. The diesel engine is a relatively high efficiency engine so the fuel consumption is very low. However, the diesel engine is a relatively heavy engine which must be carried by the aircraft, and thus less fuel and/or payload can be carried. Small gas turbine engines have been considered for use in a UAV but are not as efficient when compared to a diesel engine unless a recuperator is used. Adding a recuperator to a small gas turbine engine on a UAV creates a rather large engine. A rotary engine has also been used to power a UAV but is unreliable because these engines do not last very long. In some cases, the aircraft does not even make it back to the base and thus the entire aircraft is lost.

To be effective for use on a UAV, the engine must be able to fly at three speeds. The engine must have the capability of high enough power for takeoff. The engine must also have the power for what is referred to as dash speed when the aircraft is airborne and must fly to the destination rather quickly. Then, the most important operational speed for the engine is loiter or low speed which is when the aircraft must fly for long periods of time at the most fuel efficient rate. One major disadvantage of the gas turbine engine is that the engine is designed to operate at one speed with a high efficiency. At lower operational speeds, the gas turbine engine is at a relatively low efficiency.

BRIEF SUMMARY OF THE INVENTION

The variable bypass ratio augmented gas turbine engine configuration for powering a UAV includes a first gas turbine engine with a high pressure ratio and a second gas turbine engine with a low pressure ratio. The high pressure ratio engine discharges turbine exhaust into a mixer and augmenter to produce a hot gas stream that is passed to the turbine of the low pressure ratio engine to drive the compressor which then provides compressed air to a third combustor to produce a hot gas stream that is passed through a power turbine that drives the output shaft of the engine. At loiter speed, only the first gas turbine engine is operated and the turbine exhaust is passed through the power turbine to drive the output shaft. The high pressure ratio engine is the higher efficiency engine of the power plant and as such operates continuously.

At the maximum power output, both engines are operated in which the turbine exhaust of the first engine is mixed with compressor flow from the second engine and augmented and used to drive the second turbine in the low pressure ratio engine which then drives the second compressor to produce compressed air for a third combustor that produces a hot gas stream that is passed through the power turbine to drive the output shaft. The low pressure ratio engine is used only when high power is required such as take off and dash speed.

BRIEF DESCRIPTION OF THE SEVERAL VIEWS OF THE DRAWINGS

The FIGURE shows a cross section view of the high efficiency variable bypass ratio augmented gas turbine engine.

DETAILED DESCRIPTION OF THE INVENTION

The variable bypass augmented gas turbine engine of the present invention is intended to be used for a power plant of an unmanned aero vehicle (UAV). However, the variable bypass augmented gas turbine engine can be used for other power plants that require a high efficiency at part power settings.

The FIGURE shows the components of the variable bypass ratio augmented gas turbine power plant and includes a high pressure ratio gas turbine engine with a first compressor 11, a first combustor 12 and a first turbine 13 in which the first turbine 13 drives the first compressor 11 through a common rotor shaft. The first turbine 13 exhaust is connected to a first flow control valve 31 through a hot gas tube or conduit.

The variable bypass augmented gas turbine power plant includes a low pressure ratio gas turbine engine with a second compressor 21, a second combustor 22 and a second turbine 23. The second turbine 23 is connected to the second compressor 21 through a common rotor shaft. The second combustor 22 is not connected between the compressor output and the turbine inlet like in a typical gas turbine engine. The first flow control valve 31 is also connected to the second turbine 23 through a hot gas conduit.

The second combustor 22 is connected to a second flow control valve 32 through a hot gas conduit. The first flow control valve 31 is also connected to the second flow control valve 32 through the hot gas conduit 33. The second flow control valve 32 is connected to a power turbine 34 that is used to power the aircraft. A gear box 35 can be used to lower the rotational speed from the power turbine in order to drive a propeller 36 or a fan. A mixer 41 is connected to the first flow control valve 31 and to the second compressor 21 and receives the hot gas flow from the first turbine 13 and relatively cold compressor bleed air from the second compressor 21. The mixer combines the hot gas flow and the cold compressed air flow and delivers the mixture to a third combustor 42 in which a fuel is injected into the mixture to produce a hot gas stream that is then passed into the second turbine 23. The second turbine 23 drives the second compressor to produce compressed air for the second combustor 22 to mix with a fuel and produce a hot gas stream that is passed through the second flow valve 32 and then into the power turbine 34.

The variable bypass ratio augmented gas turbine engine of FIG. 1 can operate in its most efficient operation or in a high power state such as take off or dash speed. In the loiter speed setting, only the high pressure ratio engine is operated. The first compressor 11 produces a high pressure compressed air for the first combustor that burns a fuel to produce a high pressure hot gas stream that is then passed through the first turbine 13 that then drives the first compressor 11. The hot exhaust from the first turbine 13 flows through the first flow valve 31, through the hot gas conduit 33 and into the second flow valve 32 and then into the power turbine 34. None of the turbine exhaust from the first turbine flows into the second turbine 23. Only the high pressure ratio engine is used to drive the power turbine in the loiter operation. The power turbine then drives the propeller or fan through the output shaft 36.

In a high power operational mode of the variable bypass augmented gas turbine engine, the turbine exhaust from the first turbine 13 flows through the first flow control valve 31 and into the mixer 41. The second compressor 21 supplies 20% to 50% of its compressed air to the mixer 41 to merge with the hot gas from the first turbine 13 via the first flow control valve 31. The compressed air and the hot gas mix and then flow into the second combustor 42 where additional fuel is burned to produce an even hotter hot gas flow that then passes through the second turbine 23 to drive the second compressor 21. The compressed air from the second compressor 21 that is not bled off into the mixer 41 flows into the second combustor 22 where fuel is burned to produce a hot gas stream that flows into the second flow control valve 32 and then into the power turbine 34 to drive the fan or propeller through the gear box 35.

The variable bypass ratio augmented gas turbine engine of the FIGURE is capable of operating at higher than a two-to-one power ratio. Thus, a greater power swing and part power efficiency can be obtain over the applicant's prior invention that also uses two gas turbine engines with first and second flow control valves. The two gas turbine engines in the present invention can be the same size engines.

I claim the following:

1. A power plant for a UAV comprising:
   a first gas turbine engine having a first compressor rotatably connected to a first turbine and a first combustor to produce a first hot gas flow that is passed through the first turbine;
   a second gas turbine engine having a second compressor rotatably connected to a second turbine and a second combustor to produce a second hot gas flow that is passed through the second turbine;
   a first flow control valve having an inlet connected to an outlet of the first turbine to receive a turbine exhaust flow from the first turbine;
   the first flow control valve having an outlet selectively connected to a mixer or a second flow control valve;
   the second compressor having a bleed off passage connected to the mixer to supply bleed off air from the second compressor;
   the mixer having an outlet connected to the second combustor;
   the second compressor having an outlet connected to a third combustor that burns a fuel to produce a third hot gas flow;
   an outlet of the third combustor is connected to the second flow control valve;
   a power turbine having an inlet connected to the second flow control valve; and,
   the power turbine driving a rotor shaft to produce useful work.

2. The power plant of claim 1, and further comprising:
   the first gas turbine engine is operated at both a low power mode and a high power mode; and,
   the second gas turbine engine is not operated at the low power mode.

3. The power plant of claim 1, and further comprising:
   the first gas turbine engine is a relatively high pressure ratio engine; and,
   the second gas turbine engine is a relatively low pressure ratio engine.

4. A process for powering a UAV comprising the steps of:
   operating a first gas turbine engine to produce a first hot gas flow for a power turbine during a low power mode;
   operating the first gas turbine engine and a second gas turbine engine during a high power mode;
   during the high power mode, passing all of the first hot gas flow and some of a compressed air from a second compressor of the second gas turbine engine into a mixer;
   passing the first hot gas flow and some of the compressed air from the mixer into a second combustor to produce a second hot gas flow;
   passing the second hot gas flow through a second turbine of the second gas turbine engine to drive the second compressor;
   passing the remaining compressed air from the second compressor into a third combustor to produce a third hot gas flow; and,
   passing the third hot gas flow through the power turbine to drive a rotor shaft.

5. The process for powering a UAV of claim 4, and further comprising the steps of:
   operating the first gas turbine engine with a high overall pressure ratio; and,
   operating the second gas turbine engine with a low overall pressure ratio such that an exhaust pressure of the second compressor is greater than or equal to an exhaust pressure of the first turbine.

6. The process for powering a UAV of claim 4, and further comprising the steps of:
   at low power mode, all of the turbine exhaust gas from the first gas turbine engine is passed into the power turbine; and,
   at the high power mode, all of the turbine exhaust gas from the first gas turbine engine is passed into the second turbine of the second gas turbine engine.

7. The process for powering a UAV of claim 4, and further comprising the steps of:
   the rotor shaft is connected to a propeller or a fan to power the UAV.

* * * * *